United States Patent
Marson et al.

(10) Patent No.: US 11,863,670 B2
(45) Date of Patent: Jan. 2, 2024

(54) EFFICIENT SIDE-CHANNEL-ATTACK-RESISTANT MEMORY ENCRYPTOR BASED ON KEY UPDATE

(71) Applicant: CRYPTOGRAPHY RESEARCH, INC., San Jose, CA (US)

(72) Inventors: Mark Evan Marson, Carlsbad, CA (US); Michael Hutter, Vienna (AT); Bart Stevens, Valkenswaard (NL)

(73) Assignee: Cryptography Research, Inc., San Jose, CA (US)

( * ) Notice: Subject to any disclaimer, the term of this patent is extended or adjusted under 35 U.S.C. 154(b) by 36 days.

(21) Appl. No.: 17/601,205

(22) PCT Filed: Apr. 4, 2020

(86) PCT No.: PCT/US2020/029012
§ 371 (c)(1),
(2) Date: Oct. 4, 2021

(87) PCT Pub. No.: WO2020/219398
PCT Pub. Date: Oct. 29, 2020

(65) Prior Publication Data
US 2022/0182232 A1 Jun. 9, 2022

Related U.S. Application Data

(60) Provisional application No. 62/836,857, filed on Apr. 22, 2019.

(51) Int. Cl.
*G06F 21/00* (2013.01)
*H04L 29/06* (2006.01)
(Continued)

(52) U.S. Cl.
CPC ............ *H04L 9/0891* (2013.01); *H04L 9/003* (2013.01); *H04L 9/16* (2013.01)

(58) Field of Classification Search
CPC ......... H04L 9/0891; H04L 9/003; H04L 9/16; H04L 2209/125; H04L 9/3242; G06F 12/1408; G06F 2212/1052
See application file for complete search history.

(56) References Cited

U.S. PATENT DOCUMENTS

| | | | |
|---|---|---|---|
| 9,722,974 B1* | 8/2017 | Fuller | ................... H04L 9/0836 |
| 2006/0045264 A1* | 3/2006 | Kocher | ................... H04L 9/003 |
| | | | 380/37 |

(Continued)

FOREIGN PATENT DOCUMENTS

CN 101159556 B 1/2011

OTHER PUBLICATIONS

EP Extended European Search Report with dated Dec. 15, 2022 re: EP Appln. No. 20796307.5. 8 pages.
(Continued)

*Primary Examiner* — Lisa C Lewis
(74) *Attorney, Agent, or Firm* — Lowenstein Sandler LLP

(57) ABSTRACT

Disclosed are memory encryption systems and methods that rotate encryption keys for robust resistance against side-channel-analysis (SCA)-based attacks on communication paths between an encryption engine within a trust boundary and an external memory component. A key data structure has a plurality of keys that are used to encrypt a plurality of memory blocks in the external memory. The memory blocks encrypted with the oldest key of the key data structure are identified. Encrypted data is read from the identified memory blocks. The encrypted data is decrypted from the identified memory blocks. The data is then re-encrypted
(Continued)

using the selected key that is newer than the oldest key, and re-written to the identified memory blocks.

18 Claims, 5 Drawing Sheets

(51) Int. Cl.
*H04L 9/08* (2006.01)
*H04L 9/00* (2022.01)
*H04L 9/16* (2006.01)

(56) References Cited

U.S. PATENT DOCUMENTS

| | | | |
|---|---|---|---|
| 2007/0050642 A1* | 3/2007 | Flynn | G06F 12/1408 |
| | | | 713/192 |
| 2007/0067644 A1* | 3/2007 | Flynn | G06F 21/79 |
| | | | 713/189 |
| 2013/0275656 A1* | 10/2013 | Talagala | G06F 12/0246 |
| | | | 711/103 |
| 2013/0290736 A1* | 10/2013 | Kudoh | H04L 9/10 |
| | | | 713/189 |
| 2014/0095883 A1* | 4/2014 | Kirillov | H04L 9/0891 |
| | | | 713/176 |
| 2015/0033037 A1* | 1/2015 | Lidman | G06F 21/78 |
| | | | 713/193 |
| 2016/0182223 A1* | 6/2016 | Kishinevsky | G06F 21/85 |
| | | | 380/28 |
| 2016/0283750 A1* | 9/2016 | Durham | G06F 12/1408 |

OTHER PUBLICATIONS

Notification of Transmittal of the International Search Report and the Written Opinion of the International Searching Authority, or the Declaration with dated Jul. 16, 2020 re: Int'l Appln. No. PCT/US2020/029012, 10 pages.

Unterluggauer, Thomas et al., "MEAS: Memory Encryption and Authentication Secure Against Side-Channel Attacks", Journal of Cryptographic Engineering, Jan. 25, 2018, Retrieved on Jun. 25, 2020 from <https://link.springer.com/conent/pdf/10.1007/s13389-018-0180-2.pdf>. 22 pages.

Zhou, Yongbin et al., "Side-Channel Attacks: Ten Years After Its Publication and the Impacts on Cryptographic Module Security Testing", In: IACR Cryptol. ePrint Arch., Oct. 27, 2005, Retrieved on Jun. 25, 2020 from <https://pdfs.semanticscholor.org/5eba/4296a7a1a8e69e8659aae5dd77da3cdf1552.pdf>. 35 pages.

* cited by examiner

EFFICIENT SIDE-CHANNEL-ATTACK-RESISTANT MEMORY ENCRYPTOR BASED ON KEY UPDATE

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
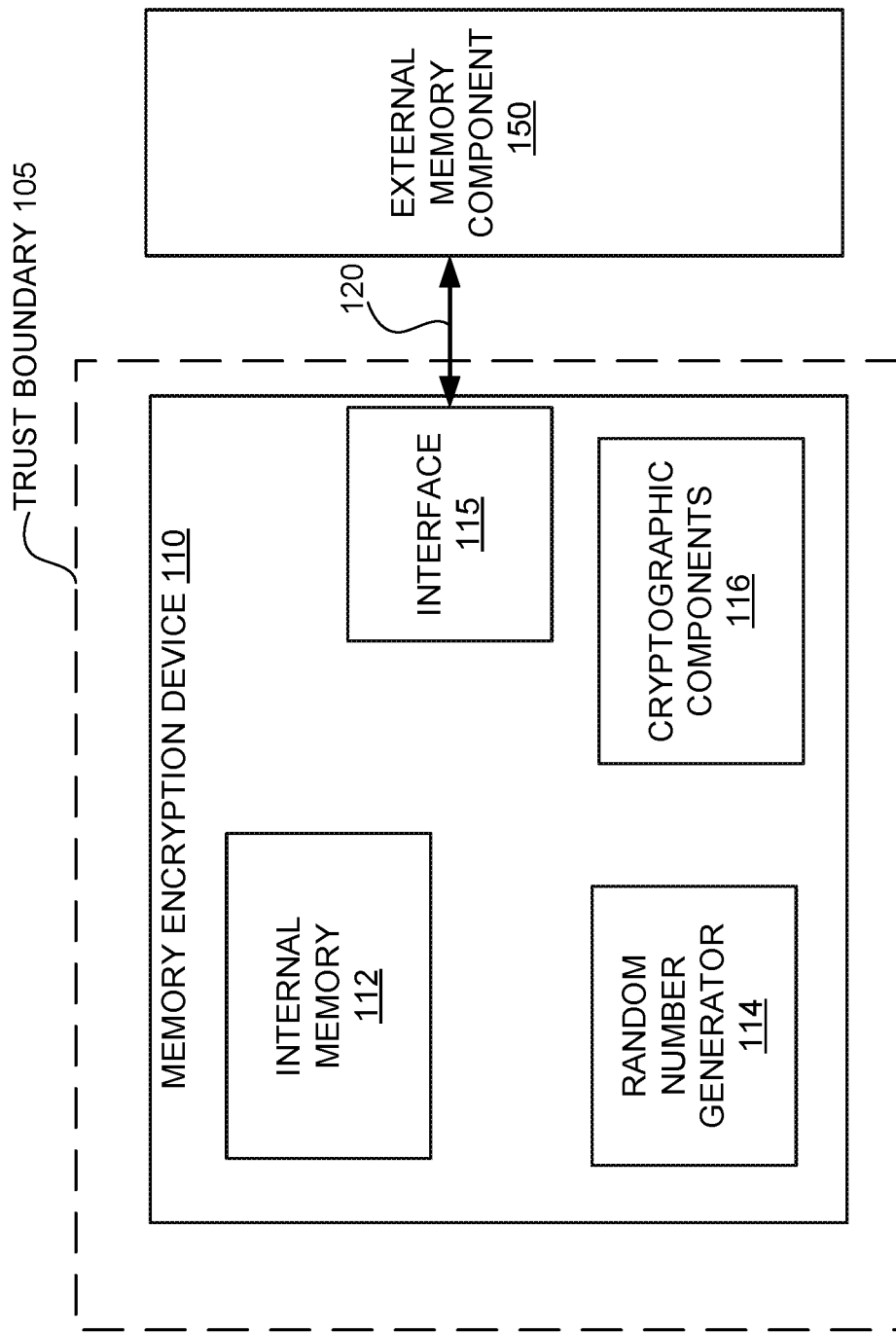
FIG. 1 illustrates an example memory encryption device having components to encrypt and decrypt data written in an external memory component, in accordance with some embodiments.

Aspects of the present disclosure are directed to memory encryption systems and methods that efficiently rotate encryption keys for robust resistance against attacks based on side-channel-analysis (SCA) on communication paths between an encryption engine and an external memory component. An example of an SCA attack includes, but is not limited to, Differential Power Analysis (DPA), where the attacker who seeks to obtain a secret key used in a cryptographic operation may study the differences in power profile (i.e., power consumption patterns) of an integrated circuit component as the cryptographic operation is performed. Using the systems and methods described herein, performance of inline memory encryption engines is improved by utilizing update memory encryption engines.

Conventional inline memory encryption systems face many challenges in order to be side-channel attack-resistant. For the decryption and re-encryption operations to be efficient, reading from external memory and writing to the external memory need to have low latency. To meet high throughput requirement at low latency, often a large number of inline encryption engines operate in tandem (e.g., in parallel to one another, or in other configurations that work in unison with each other). If each of the large number of inline encryption engines themselves is SCA attack resistant (also sometimes referred to as side-channel resistant), then the communication path to and from the external memory does not add to side-channel vulnerability. However, the encryption system becomes prohibitively expensive in terms of gate count and area if inline encryption engines themselves are side-channel resistant. An alternative approach used in some conventional encryption systems is based on updating the encryption keys in the inline encryption engines frequently enough to thwart attempts at SCA attack, thereby avoiding the need to use side-channel resistant inline encryption engines. The difficulty with this alternative approach lies in dealing with data encrypted with expired keys, which may negatively impact or even stall performance.

Aspects of the present disclosure address the above and other deficiencies by including a plurality of memory update encryption engines that work in tandem with a plurality of inline encryption engines to achieve side-channel resistance without significantly impacting performance of the memory encryption system. To prevent stalls, the memory update encryption engine updates the memory pages (e.g., all memory pages) in the external memory component that are encrypted with the very oldest key in a key data structure (e.g., a key table) before the inline encryption engine performs a fresh write with a new key selected from the key data structure. This way, the key data structure does not grow in size, and does not need additional internal memory space.

Advantages of this approach include, but are not limited to, the ability to tune a memory encryption system for optimal key usage. The present approach recognizes that each key may be used a number of times in its lifetime. Therefore, it may not be optimal to just use the newest key in the key data structure to encrypt data to be written to the external memory page. The present method can select keys used for write operations and can update the selected keys randomly, by using a weighted random process, or using a different selection process, depending on multiple factors, such as the size of the key data structure, the number of pages in the external memory, the number of inline memory and memory update encryption engines, etc., and can rotate the same key as long as the key is newer than the oldest key.

An additional advantage of the approach disclosed herein is that the approach is agnostic of memory technology. For example, the methods are equally applicable to Field Programmable Gate Array (FPGA) Block Random Access Memory (RAM), Application-Specific Integrated Circuit (ASIC) RAM, macro cells, registers and any other type of memory technology. Furthermore, the overall implementation cost decreases because of zero overhead on external memory resources.

FIG. 1 illustrates an example memory encryption device 110 having cryptographic components to encrypt and decrypt data written in an external memory component, in accordance with some embodiments. The memory encryption device 110 may reside within a trust boundary 105 (i.e., a boundary within which possibility of data leakage is minimal, and within which data is secure against SCA attacks). The memory encryption device 110 can include, among other components, an internal memory component 112, a random number generator component 114, cryptographic components 116 (e.g., inline memory encryption engine banks and memory update encryption engine banks, illustrated in FIG. 2), and an interface 115 to communicate with external memory component 150 residing outside the trust boundary 105. In alternative embodiments, the functionality of one or more of the components may be combined or divided. The communication path 120 outside the trust boundary may compromise data security during SCA attack. Therefore, the cryptographic components 116 perform operations within the trust boundary to minimize vulnerability in the communication path 120.

Data can be written to or read from the external memory 150 in finite-size blocks, e.g., page-size blocks or blocks of other sizes. The size of the blocks can be configurable. The memory blocks are typically encrypted. The random number generator component 114 may be a True Random Number Generator (TRNG) or a Deterministic Random Bit Generator (DRBG), also known as a Pseudo-Random Number Generator (PRNG). Component 114 can generate a number of keys that may be stored in a key data structure (e.g., a key table such as key table 212A shown in FIG. 2, a file, etc.). These keys can be used to encrypt the memory blocks, such as memory pages.

The internal memory 112 is within the trust boundary 105 and is assumed to be protected against SCA attacks. The internal memory 112 may store the key data structure and a key map (e.g., key table 212A and key map 212B shown in FIG. 2). Note that one key in the key data structure may be used to encrypt multiple memory blocks. For example, a plurality of memory pages may have the same page key. A key map (e.g., key map 212B in FIG. 2) is a lookup data structure that offers means of indexing into its individual elements. For example, key map 212B keeps track of the logical addresses of the physical memory locations along with the corresponding keys, i.e., which memory block is encrypted with which key. The key map may have one entry per memory block including identification (ID) of the key used to encrypt that memory block. The key map may also have status fields, e.g., currently encrypted, currently being decrypted, etc.

Figure 2:
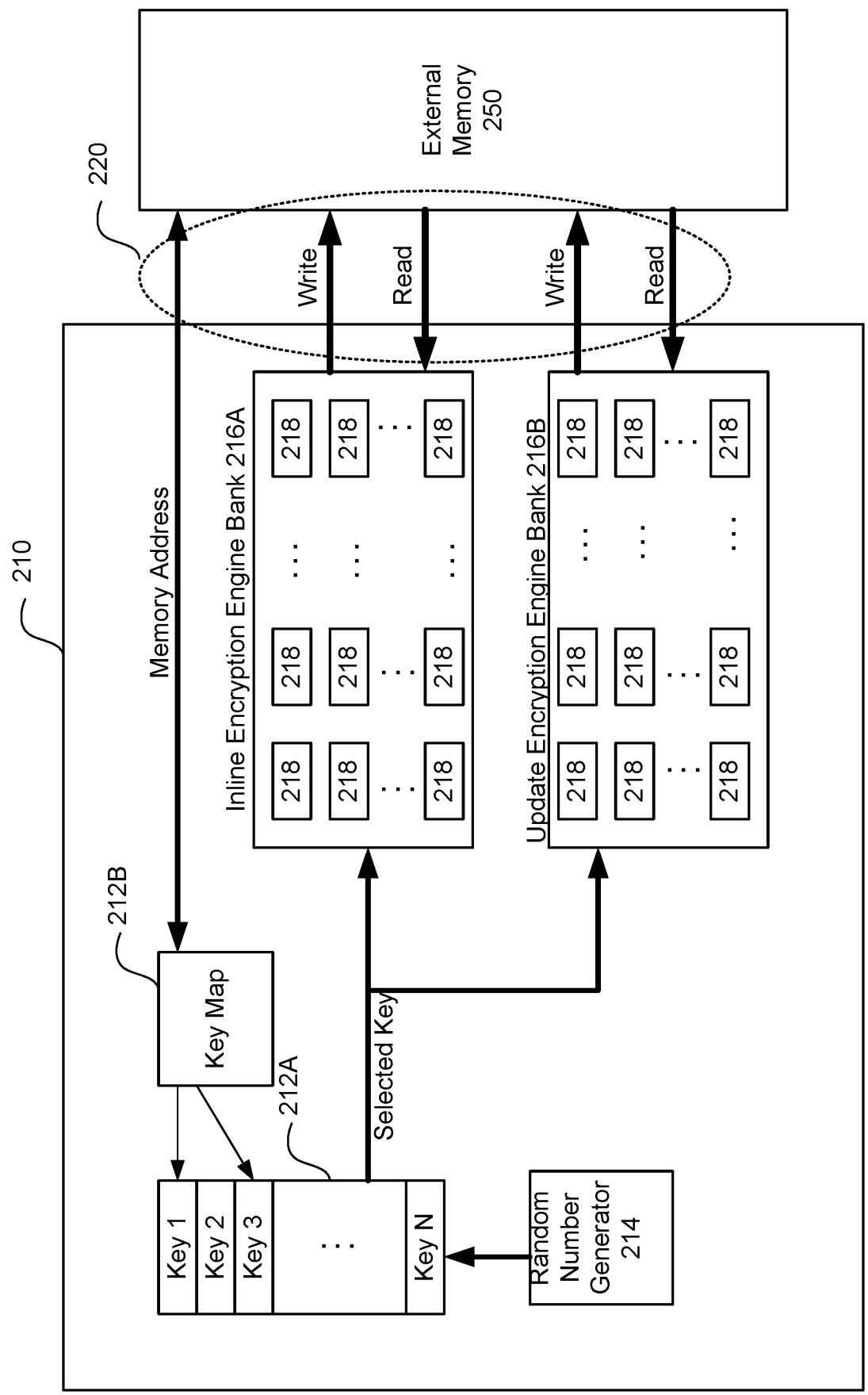
FIG. 2 is a functional block diagram of the memory encryption device having an inline encryption engine bank and a memory update encryption engine bank, in accordance with some embodiments.

FIG. 2 is a functional block diagram of the memory encryption device of FIG. 1 within the trust boundary 105, in accordance with some aspects of the present disclosure. As discussed above, cryptographic components 116 of FIG. 1 can comprise banks of inline memory encryption engines 216A and banks of memory update encryption engines 216B, within the trust boundary. Memory encryption block 210 in FIG. 2 performs the function of the memory encryption device 110 shown in FIG. 1, and external memory 250 in FIG. 2 is equivalent to the external memory component 150 shown in FIG. 1. The read/write paths between the memory encryption block 210 and the external memory 250 are collectively shown as element 220 within the dashed oval. Element 220 is functionally equivalent to the communication path 120 shown in FIG. 1. Though multiple read/write paths are shown in FIG. 2, there may be a consolidated input port for writing to external memory 250 and a consolidated output port for reading from the external memory 250. A random number (e.g., a random number generated by the component 214 shown in FIG. 2) can be generated to be used as a key stored in the key table 212A. A particular key from the stored keys (e.g., key 1, key 2, key 3, . . . , key N) can be selected by the encryption algorithm to encrypt data to be written to the external memory 250.

Though shown separately as functional blocks 216A and 216B in FIG. 2, the inline memory encryption engines and update encryption engines may reside in the same bank of engines, with their respective roles being determined by configuration parameters. A non-exhaustive list of configuration parameters may include the number of available encryption engines 218, the size of the key table 212A, the size of each memory block, the total size of the external memory 250, etc. Additionally, the number of encryption engines 218 for banks 216A and 216B do not have to be the same. For example, bank 216A can have a different number of engines 218 than bank 216B, because the update engine can run with a lower throughput to save area on an integrated circuit.

In some embodiments, the inline encryption engine bank 216A positioned within the trust boundary can be used to encrypt data written to the external memory and/or decrypt data read from the external memory. In addition, the inline encryption engine bank 216A can compute a Message Authentication Code (MAC) based on the key that is currently used to encrypt data, or based on an additional key. A MAC is a tag that protects data integrity and authenticity. The MAC of the encrypted data can be computed using the selected key using a standard authenticated encryption protocol in which the address of the memory block is incorporated into the protocol. For example, when the Advanced Encryption Standard (AES) GCM (Galois Counter Mode) protocol is used, the counter value can be a concatenation of a counter with the address of the memory block. The MAC can also be written with the encrypted data to the external memory address for bolstering security against SCA attack.

The update encryption engine bank 216B positioned within the trust boundary helps updating memory blocks by encrypting stored data with a newer key. A newer key refers to a key that was generated subsequent to (i.e., at a later time than) the time of generation of a particular key (e.g., the currently used key). Note that the selected newer key should be more recent than the key currently being used, but does not have to be the newest generated key. The update encryption engine bank 216B can ensure that the oldest key in the key data structure gets dropped to make room for a newer key. It can also ensure that the key data structure remains at a fixed size, i.e., the key data structure does not store more than a predetermined maximum number of keys. To keep the fixed size, the key data structure may be populated in a First-In-First-Out (FIFO) manner. The update encryption engine bank 216B may operate in the background in tandem with the inline encryption engine bank 216A (e.g., in parallel to the operation of the inline encryption engine bank 216A). Various engines within the engine banks 216A and 216B may read the memory blocks and corresponding keys in a pipelined architecture, where an update encryption engine is subordinate to an inline encryption engine. In other words, if an update encryption engine and an inline encryption engine try to update a memory block at the same time, then the operation of the update encryption engine can be aborted.

Figure 3:
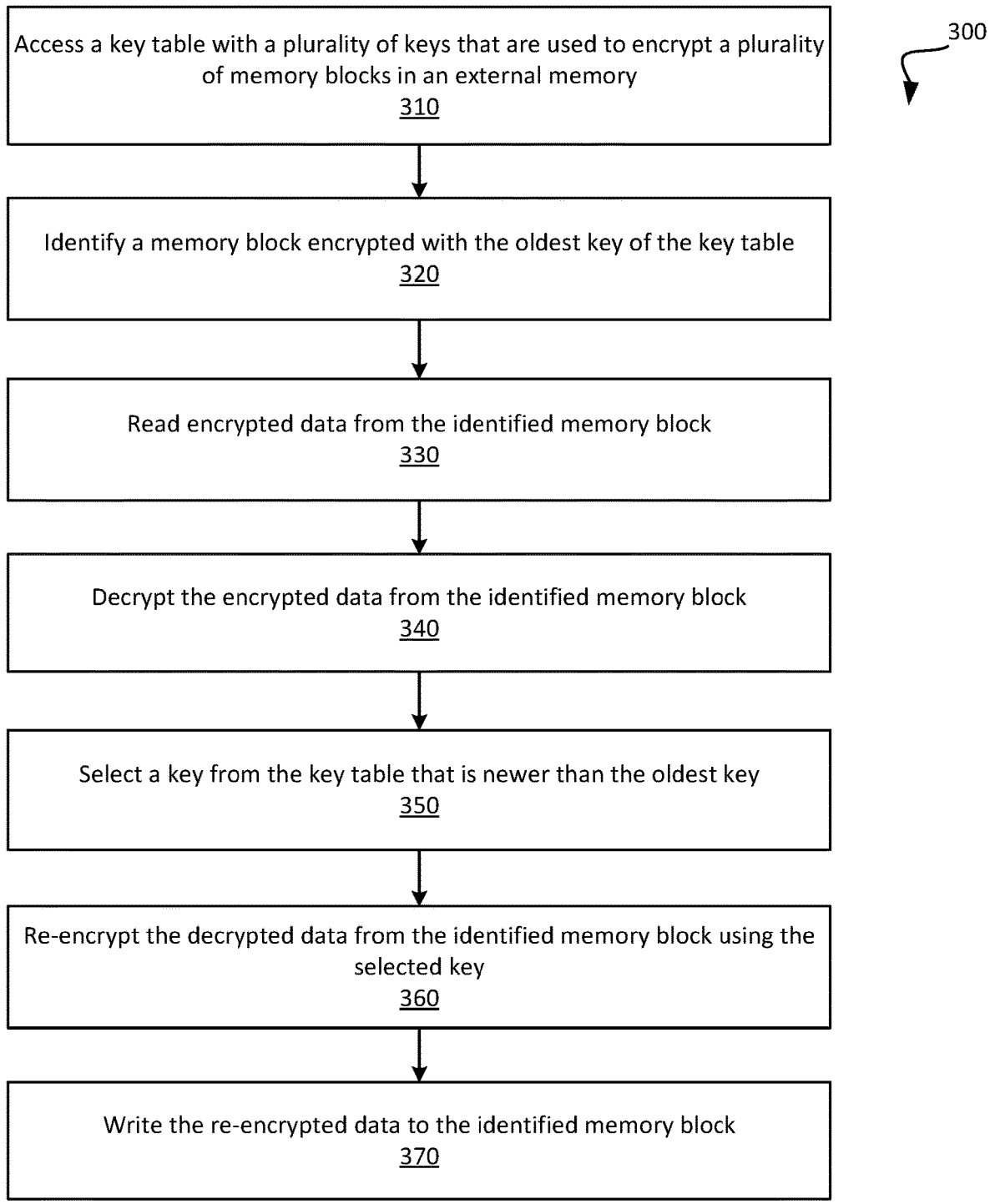
FIG. 3 is a flow diagram of an example method to decrypt and re-encrypt data written in an external memory component, in accordance with some embodiments of the present disclosure.

FIG. 3 is a flow diagram of an example method 300 to perform a SCA-resistant data transfer between a CPU and an external memory, in accordance with some embodiments of the disclosure. The method 300 may be performed by processing logic that may include hardware (e.g., processing device, circuitry, dedicated logic, programmable logic, microcode, hardware device, integrated circuit, etc.), software (e.g., instructions run or executed on a processing device), or a combination thereof. In some embodiments, the method 300 may be performed by the cryptographic components 116 shown in FIG. 1.

Method 300 starts at operation 310, where a key data structure (e.g., a key table, a file, etc.) is accessed. The key data structure can include a plurality of keys that are used to encrypt a plurality of memory blocks (e.g., memory pages) in an external memory. The currently residing data in the memory blocks in the external memory can be already encrypted with a current set of keys. In some implementations, the key data structure can be maintained (e.g., created and/or updated) by the memory encryption device 110.

At operation 320, one or more memory blocks that are encrypted with the oldest key are identified. This operation can be performed by the update encryption engine to facilitate the inline encryption engine. A key map (e.g., key map 212B) may be used to identify the one or more memory blocks that are encrypted with the oldest key. In some implementations, the key map can be maintained (e.g., created and/or updated) by the memory encryption device 110.

At operation 330, the data from the identified memory blocks (that are encrypted with the oldest key) is read by the inline encryption engine. During reading, the inline encryption engine can read the key map (e.g. key map 212B in FIG. 2) to determine which key is currently used to encrypt the memory block. If a MAC is also currently written in the identified memory block, then the inline encryption engine can read the MAC as well.

At operation 340, the data read from the memory block(s) is decrypted using information stored in the key map and the key table (e.g., accessing the key map using the address of the memory location of the data to identify an appropriate key stored in the key table). If a MAC was read at operation 330, then prior to decrypting, the inline encryption engine can check whether the MAC is valid (e.g., by comparing the MAC read from the retrieved data with a previously stored value).

At operation 350, a key is selected from the key data structure that is newer than (i.e., generated subsequent to) the oldest key (i.e., the key generated earlier than any other key included in the key data structure). As mentioned before, the selected key should be newer than the oldest key, but not necessarily the most recently generated key. A random process (based on a random key selection regardless of how many times each key is being reused) or weighted random process (based on a random key selection that considers how many times each key is being reused) may be used to select a newer key from the key data structure. A different selection process may be used too.

At operation 360, the decrypted data is re-encrypted with the newer key. Optionally, a MAC can also be computed by using an authenticated encryption protocol (e.g., AES GCM). As mentioned before, in AES GCM, the computed counter value can be a concatenation of a counter with the address of the memory block. This operation can be performed by the inline encryption engine.

At operation 370, the re-encrypted data (and the MAC, if computed at operation 360) is written to the memory block. Optionally, the key map 212B is updated by the inline memory encryption engine.

Figure 4:
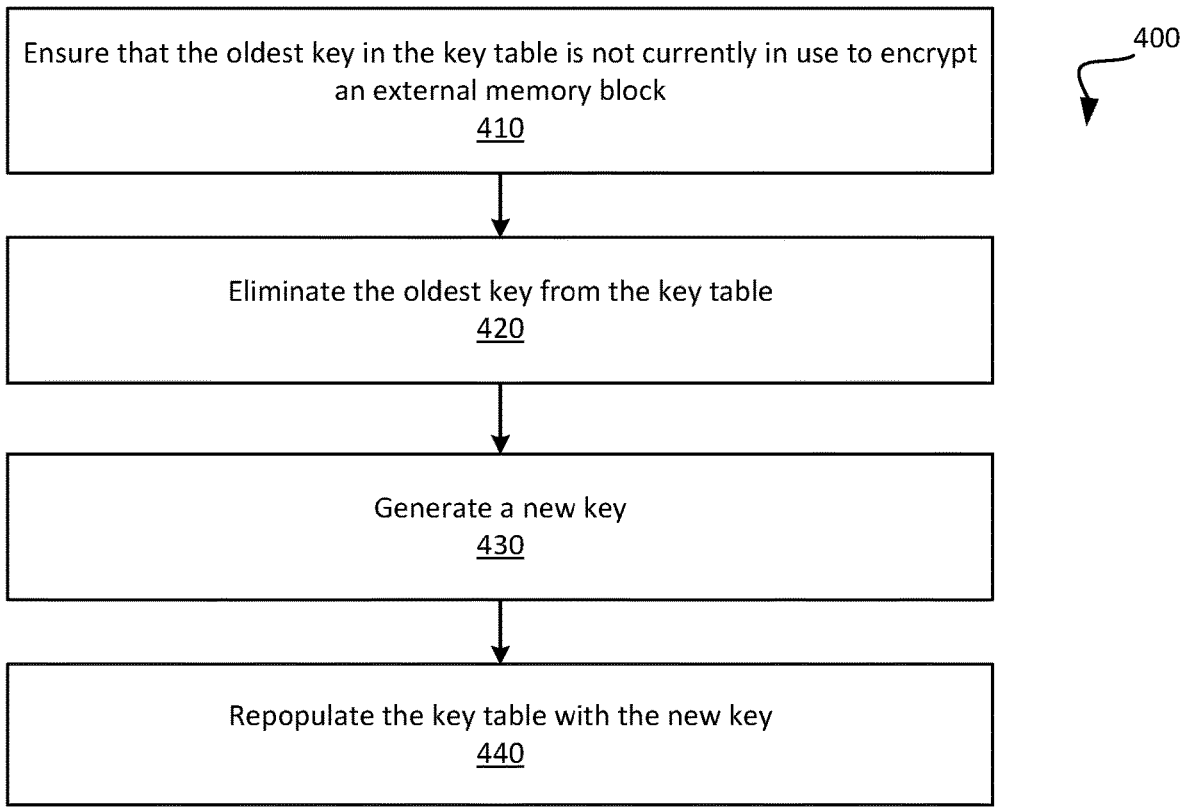
FIG. 4 is a flow diagram of an example method performed by a memory update encryption engine, in accordance with some embodiments of the present disclosure.

FIG. 4 is a flow diagram of an example method 400 showing additional operations performed by a memory update encryption engine, in accordance with some embodiments of the disclosure. The method 400 may be performed by processing logic that may include hardware (e.g., processing device, circuitry, dedicated logic, programmable logic, microcode, hardware device, integrated circuit, etc.), software (e.g., instructions run or executed on a processing device), or a combination thereof. In some embodiments, the method 400 may be performed by the cryptographic components 116 shown in FIG. 1.

Method 400 begins at operation 410, with the update encryption engine ensuring that the oldest key of the key data structure is not currently in use to encrypt an external memory block. The method then advances to operation 420, where the update encryption engine eliminates the oldest key from the key data structure. Operations 410 and 420 may occur in between operations 340 and 350 performed by the inline encryption engine in method 300. Note that even though operations 330 to 370 are described above to be performed by the inline encryption engine, the update encryption engine may also perform operations 330 to 370. But, in some embodiments, the inline encryption engine takes precedence over updates by the update encryption engine. For example, if an update encryption engine and an inline encryption engine try to update a memory block at the same time, then the operation of the update encryption engine is aborted.

At operation 430, a new key is generated (e.g., using the random number generator 214). The key data structure such as the key table is re-populated with the new key, as there is room in the fixed-size key data structure after the elimination of the oldest key at operation 420. The update encryption engine can ensure that the size of the key data structure does not grow, and the use of the keys in the data structure is optimized by rotation.

Figure 5:
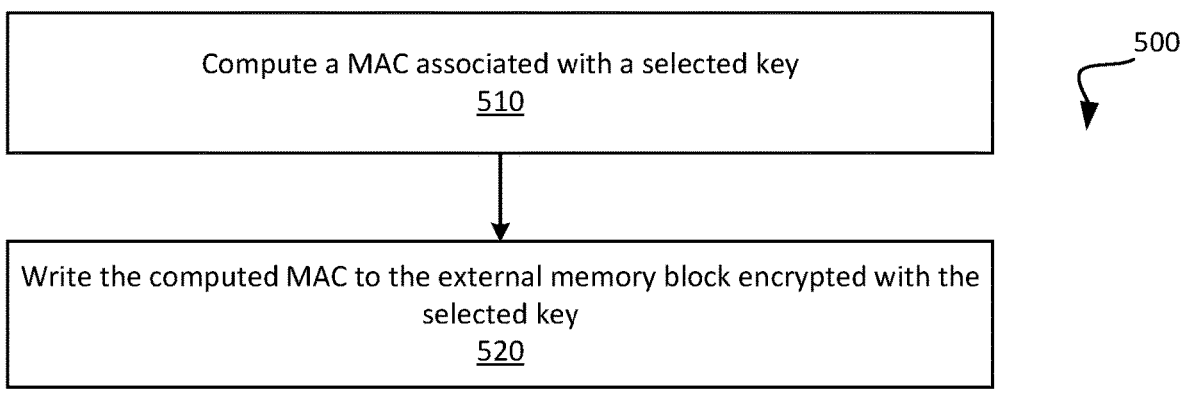
FIG. 5 is a flow diagram of an example method to compute and utilize a Message Authentication Code (MAC) for enhanced data integrity, in accordance with some embodiments of the present disclosure.

FIG. 5 is a flow diagram of an example method 500 performed by either or both an inline encryption engine and an update encryption engine, in accordance with some embodiments of the disclosure. The method 500 may be performed by processing logic that may include hardware (e.g., processing device, circuitry, dedicated logic, programmable logic, microcode, hardware device, integrated circuit, etc.), software (e.g., instructions run or executed on a processing device), or a combination thereof. In some embodiments, the method 500 may be performed by cryptographic components 116 of FIG. 1.

At operation 510, a MAC is computed based on the new key that is selected to re-encrypt data at operation 360. At operation 520, the computed MAC is also written with the encrypted data to the external memory address for providing additional security and integrity. Using a MAC increases security in general, because it protects data against modifications. While reading data from the external memory block, MAC is verified before decrypting the data.

Persons skilled in the art will understand that although the flow diagrams in FIGS. 3-5 show a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6:
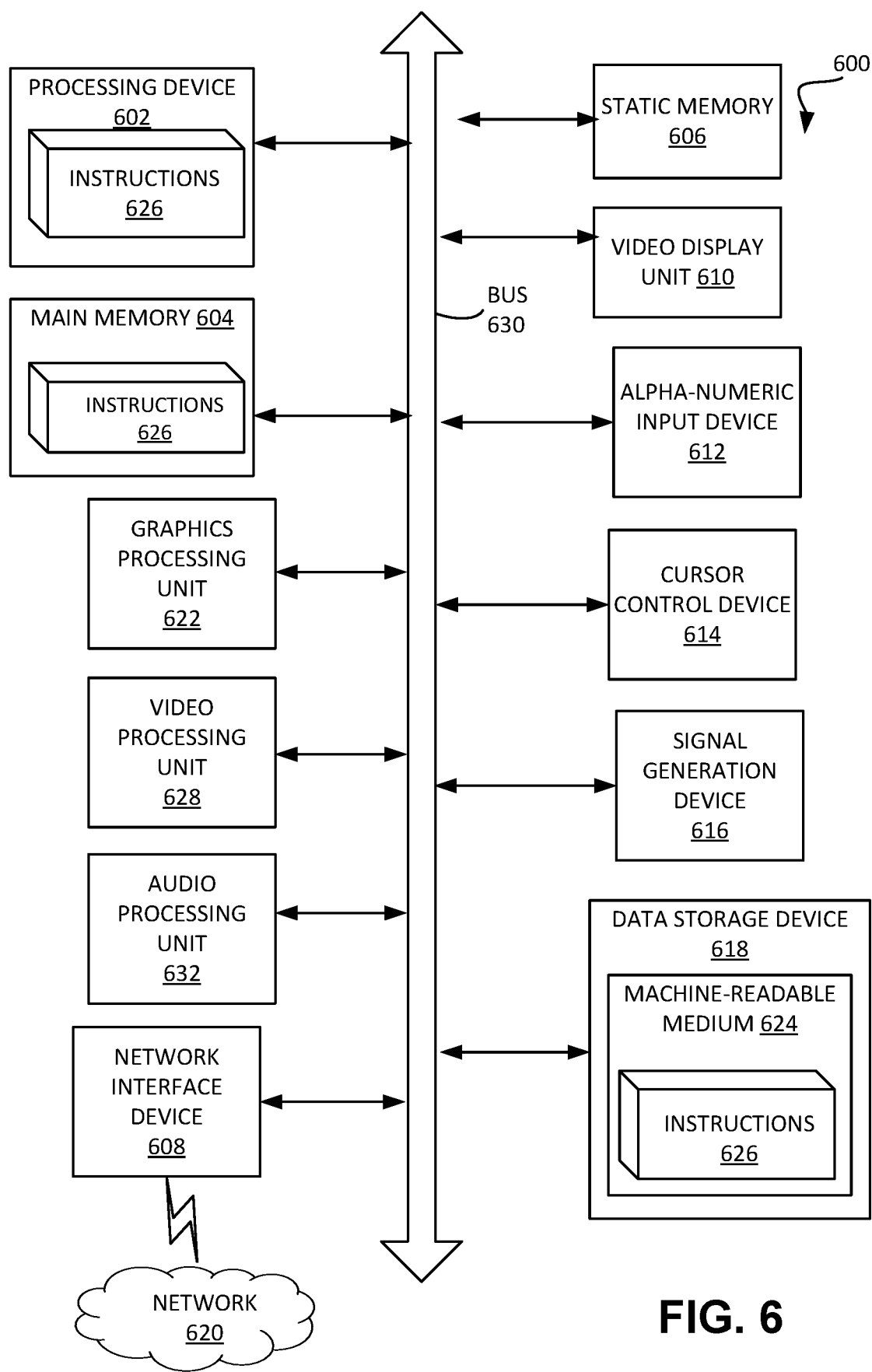
FIG. 6 illustrates a block diagram of a sample computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, an Internet of things (IoT) device, a storage solution/controller, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. In one implementation, processing device 602 may be an embedded CPU within the trust boundary 105, and memory 606 may be external memory 150 shown in FIG. 1.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to memory encryption module 210 of FIG. 2. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "selecting" or "generating" or "verifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, USB sticks, Flash (SD) cards, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-hardware implemented method comprising:
   accessing a key data structure comprising a plurality of encryption keys that are used to encrypt a plurality of memory blocks in an external memory;
   identifying a memory block of the plurality of memory blocks that is encrypted with an oldest encryption key in the key data structure;
   reading encrypted data from the identified memory block;

decrypting the encrypted data from the identified memory block;
selecting an encryption key from the key data structure, wherein the selected encryption key is newer than the oldest encryption key;
re-encrypting the decrypted data from the identified memory block using the selected encryption key;
allowing an inline encryption engine to take precedence over updates from a memory update encryption engine that operates in tandem with the inline encryption engine; and
writing the re-encrypted data to the identified memory block.

2. The method of claim 1, further comprising:
eliminating the oldest encryption key from the key data structure; and
generating a new encryption key to re-populate the key data structure.

3. The method of claim 2, wherein the method further comprises:
prior to eliminating the oldest encryption key from the key data structure, ensuring that the oldest encryption key is not currently in use to encrypt a memory block.

4. The method of claim 2, wherein the key data structure stores a predetermined fixed number of encryption keys.

5. The method of claim 4, wherein the key data structure is updated on a first-in-first-out (FIFO) basis and wherein the oldest encryption key is to be eliminated in order to accommodate the new encryption key.

6. The method of claim 1, wherein the method further comprises:
prior to decrypting data, verifying that a Message Authentication Code (MAC) associated with the oldest encryption key is valid.

7. The method of claim 1, wherein the method further comprises:
prior to writing the re-encrypted data, computing a MAC associated with the selected encryption key; and
writing the computed MAC to the identified memory block.

8. The method of claim 7, wherein the new MAC is computed using the selected encryption key with an authenticated encryption protocol that incorporates an address of the identified memory block.

9. The method of claim 1, wherein the encryption key is selected from the key data structure using a random process, weighted random process, or a different selection process.

10. A system comprising:
an external memory with a plurality of memory blocks; and
a computer processor, wherein the computer processor comprises an inline encryption engine and a memory update encryption engine that operates in tandem with the inline encryption engine, the computer processor being operatively coupled with the external memory, to, within a trust boundary of the computer processor:
access a key data structure with a plurality of encryption keys that are used to encrypt the plurality of memory blocks in the external memory;
identify a memory block of the plurality of memory blocks that is encrypted with an oldest encryption key of the key data structure;
read encrypted data from the identified memory block;
decrypt the encrypted data from the identified memory block;
select an encryption key from the key data structure, wherein the selected encryption key is newer than the oldest encryption key;
re-encrypt the decrypted data from the identified memory block using the selected encryption key; and
write the re-encrypted data to the identified memory block.

11. The system of claim 10, wherein the memory update encryption engine eliminates the oldest encryption key from the key data structure, and, re-populates the key data structure with a newly generated encryption key.

12. The system of claim 11, wherein the memory update encryption engine, prior to eliminating the oldest encryption key from the key data structure, ensures that the oldest encryption key is not currently in use to encrypt a memory block.

13. The system of claim 10, wherein the key data structure stores a predetermined fixed number of encryption keys.

14. The system of claim 10, wherein the memory update encryption engine verifies that a Message Authentication Code (MAC) associated with the oldest encryption key is valid.

15. The system of claim 10, wherein the inline encryption engine computes a MAC associated with the selected encryption key, and writes the computed MAC to the identified memory block.

16. The system of claim 15, wherein the new MAC is computed using the selected encryption key with an authenticated encryption protocol that incorporates an address of the identified memory block.

17. The system of claim 10, wherein the inline encryption engine and the memory update encryption engine reside in the same bank of engines with their roles determined by a plurality of configuration parameters.

18. A non-transitory computer-readable storage medium storing instructions that, when executed by a processor, cause the processor to:
access a key data structure with a plurality of encryption keys that are used to encrypt the plurality of memory blocks in an external memory outside of a trust boundary of the processor, wherein the external memory is coupled to the processor, and wherein the processor comprises an inline encryption engine and a memory update encryption engine that operates in tandem with the inline encryption engine;
identify a memory block of the plurality of memory blocks that is encrypted with an oldest encryption key of the key data structure;
read encrypted data from the identified memory block;
decrypt the encrypted data from the identified memory block;
select an encryption key from the key data structure, wherein the selected encryption key is newer than the oldest encryption key;
re-encrypt the decrypted data from the identified memory block using the selected encryption key; and
write the re-encrypted data to the identified memory block.

* * * * *